United States Patent
Liu et al.

(10) Patent No.: US 9,913,150 B2
(45) Date of Patent: Mar. 6, 2018

(54) METHOD AND DEVICE FOR IMPLEMENTING MICROWAVE DEVICE TRUSTEESHIP

(71) Applicant: ZTE CORPORATION, Shenzhen, Guangdong Province (CN)

(72) Inventors: Yazhou Liu, Shenzhen (CN); Guangwei Li, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 337 days.

(21) Appl. No.: 14/647,431

(22) PCT Filed: Sep. 23, 2013

(86) PCT No.: PCT/CN2013/084016
§ 371 (c)(1),
(2) Date: May 26, 2015

(87) PCT Pub. No.: WO2014/082486
PCT Pub. Date: Jun. 5, 2014

(65) Prior Publication Data
US 2015/0312777 A1    Oct. 29, 2015

(30) Foreign Application Priority Data
Nov. 27, 2012 (CN) .......................... 2012 1 0491007

(51) Int. Cl.
*H04W 80/04* (2009.01)
*H04W 24/02* (2009.01)
(Continued)

(52) U.S. Cl.
CPC ......... *H04W 24/02* (2013.01); *H04L 41/0806* (2013.01); *H04L 45/586* (2013.01)

(58) Field of Classification Search
CPC ..... H04W 24/02; H04W 72/04; H04W 84/12; H04L 41/0806; H04L 12/713; H04L 12/24; H04L 12/28
See application file for complete search history.

(56) References Cited

U.S. PATENT DOCUMENTS

2009/0185691 A1* 7/2009 Falk ................. H04L 63/06 380/279
2010/0275248 A1* 10/2010 Li .................... H04L 29/04 726/4
(Continued)

FOREIGN PATENT DOCUMENTS

CN   101217293 A   7/2008
CN   101488777     7/2009
(Continued)

OTHER PUBLICATIONS

International Search Report (Form PCT/ISA/210) for PCT/CN2013/084016, dated Dec. 26, 2013.
(Continued)

*Primary Examiner* — Andrew Lee
(74) *Attorney, Agent, or Firm* — Koppel, Patrick, Heybl & Philpott (57) ABSTRACT

Disclosed are a method and device for implementing a microwave device trusteeship. The method includes: a plurality of all-outdoor units (AOUs) are configured into a trusteeship mode; res the AOUs already configured into the trusteeship mode are respectively connected to the ports of the service units of an IP device; by accessing the IP device by the AOUs configured into a trusteeship mode, the connected AOUs are configured at the corresponding ports of the service unit of the IP device, and the virtual slot numbers of the connected AOUs are generated; and the IP device selects at least two AOUs from the plurality of AOUs already configured into a trusteeship mode to form a pro-
(Continued)

tection group, and sets a transmission unit number for each selected corresponding AOU, so as to virtually set each of the selected AOUs as a transmission unit of the IP device. The present invention enables a user to achieve the management of protection configuration, XPIC configuration, PLA configuration and other configurations, thereby achieving the unified management and quick configuration of all-outdoor devices, and facilitating the cooperative usage of the devices.

20 Claims, 4 Drawing Sheets

(51) Int. Cl.
*H04L 12/24* (2006.01)
*H04L 12/713* (2013.01)

(56) References Cited

U.S. PATENT DOCUMENTS

| | | | |
|---|---|---|---|
| 2012/0100801 | A1 | 4/2012 | Yuan et al. |
| 2012/0195392 | A1 | 8/2012 | Kushnir et al. |
| 2016/0021117 | A1* | 1/2016 | Harmon ................ H04L 63/105 726/1 |
| 2016/0330230 | A1* | 11/2016 | Reddy ................ H04L 63/1433 |

FOREIGN PATENT DOCUMENTS

| | | |
|---|---|---|
| CN | 101567795 A | 10/2009 |
| CN | 101848102 | 9/2010 |
| CN | 102480413 A | 5/2012 |

OTHER PUBLICATIONS

European Search Report, Application No. 13859020.3, dated Nov. 12, 2015.

* cited by examiner

METHOD AND DEVICE FOR IMPLEMENTING MICROWAVE DEVICE TRUSTEESHIP

TECHNICAL FIELD

The present invention relates to the technical field of microwave communication, in particular, to a method and device for implementing microwave device trusteeship.

BACKGROUND

Microwave communication has played a pivotal role in the field of communications, and as a quick means of communication, plays an integral role in the mobile network. However, with the evolution of network technology, base stations gradually develop towards the direction of small coverage, high-density deployment, and large-capacity transmission.

The traditional split type microwave device is divided into two parts: an indoor unit and an outdoor unit, which are connected via an intermediate frequency to respectively achieve the baseband modulation and radio frequency transceiving functions. In this way, in the future large-scale deployment of the LTE, a lot of venues need to be rented, the installation is complex, and the power consumption of the device is large. To solve such problems, a device to integrate all of the baseband and modem units into an outdoor device unit emerged. Currently, this type of device can transmit all IP services, and if an IP service is accessed, the device can be directly connected to the base station to achieve "zero land occupation" all-outdoor installation; if various types of services are accessed, it needs to be used in conjunction with an IP transmission device to provide the transmission of a variety of services.

Currently, an all-outdoor device can be independently configured and managed, but in order to ensure the stability of the transmission service of the microwave device, the all-outdoor device needs to support various air interface configurations of the air interface service, including: 1+1HSB, 1+1HSB+SD, 1+1HSB+FD, 2+0XPIC, 2+0XPIC (PLA), 2+2XPIC+HSB, 2+2XPIC+HSB+SD. For these above-mentioned types of service models, two or more devices need to be used in conjunction, and configuration items between the devices need to be identical or have a certain corresponding relationship; in this case, if a way of independent configuration is used, it not only increases the complexity of the user configuration, but also is extremely easy to cause a configuration error situation, thus bringing inconvenience to the testing, installation and maintenance of the device. The present invention proposes a method for trusting an all-outdoor device to mainly solve this problem.

SUMMARY

The embodiments of the present invention provide a method for implementing microwave device trusteeship, so as to solve the problem that the operations of protection configuration, XPIC configuration, PLA configuration in microwave devices and other configurations that require the cooperation of the microwave devices are complex. Meanwhile, this method can expand the transmission direction of trusted devices.

The embodiments of the present invention provide a device for implementing microwave device trusteeship.

According to a first aspect of the present invention, a method for implementing microwave transmission device trusteeship is provided, which includes the steps of:

configuring a plurality of all-outdoor units (AOUs) into a trusteeship mode;

respectively connecting a plurality of AOUs already configured into a trusteeship mode to the ports of a service unit of an IP device;

by accessing the IP device by the AOUs configured into a trusteeship mode, configuring the connected AOUs at the corresponding ports of the service unit(s) of the IP device, and generating virtual slot numbers of the connected AOUs; and the IP device selecting at least two AOUs from the plurality of AOUs already configured into a trusteeship mode to form a protection group, and setting a transmission unit number for each selected corresponding AOU, so as to virtually set each of the selected AOUs as a transmission unit of the IP device.

Preferably, the transmission unit number set for the selected corresponding AOU is a virtual slot number of the AOU.

Preferably, the method of the present invention further includes: the IP device receiving and storing user configuration data about configuration of the protection group, which is issued by a user, and after converting the user configuration data into a data structure required by the AOU, distributing same to all the AOUs of the protection group.

Preferably, the IP device uses a main control unit 102 thereof to store data of all the trusted AOUs, so as to manage an AOU system as a controlled system of the IP device.

Preferably, the method of the present invention further includes: after the IP device distributes the user configuration data to all the AOUs of the protection group, an AOU determining a working mode thereof by detecting a connection state with the IP device.

Preferably, the operation of an AOU determining a working mode thereof by detecting a connection state with the IP device includes: when the AOU detects that it has already been connected to the IP device, if the AOU is working in a trusteeship mode, it continuing to maintain a trusteeship mode thereof; otherwise, it modifying the mode into a trusteeship mode.

Preferably, the IP device uses a trusteeship module thereof to cooperate with the trusted AOUs, so as to maintain a trusteeship service.

Preferably, the IP device uses a service module 103 of each trusted AOU connected thereto to transmit service data and management data.

Preferably, the protection group includes one of the following:

a 1+1HSB protection pair configured by two AOUs;
an XPIC transmission unit configured by two AOUs;
an XPIC transmission unit with PLA configuration configured by two AOUs; and
two protection pairs configured by four AOUs.

According to a second aspect of the present invention, a device for implementing microwave transmission device trusteeship is provided, includes:

an AOU trusteeship mode configuration module set to configure all-outdoor units (AOUs) into a trusteeship mode;

an AOU connection module set to respectively connect the AOUs already configured into a trusteeship mode to the ports of a service unit of an IP device;

an IP device service unit configuration module set to configure the connected AOUs at the corresponding ports of the service unit of the IP device and generate virtual slot numbers of the connected AOUs when the AOUs configured into a trusteeship mode access the IP device; and a virtual transmission unit generation module set to let the IP device select at least two AOUs from the plurality of AOUs already configured into a trusteeship mode to form a protection group, and set a transmission unit number for each selected corresponding AOU, so as to virtually set each of the selected AOUs as a transmission unit of the IP device.

With respect to the prior art, the beneficial technical effect of the present invention is: a user is able to achieve the management of protection configuration, XPIC configuration, PLA configuration and other configurations, thereby achieving the unified management and quick configuration of all-outdoor devices, and facilitating the cooperative usage of the devices.

DETAILED DESCRIPTION OF THE EMBODIMENTS

Below is the description of a method for unified management and quick configuration in the solution of the present invention in conjunction with the accompanying drawings.

Figure 1:
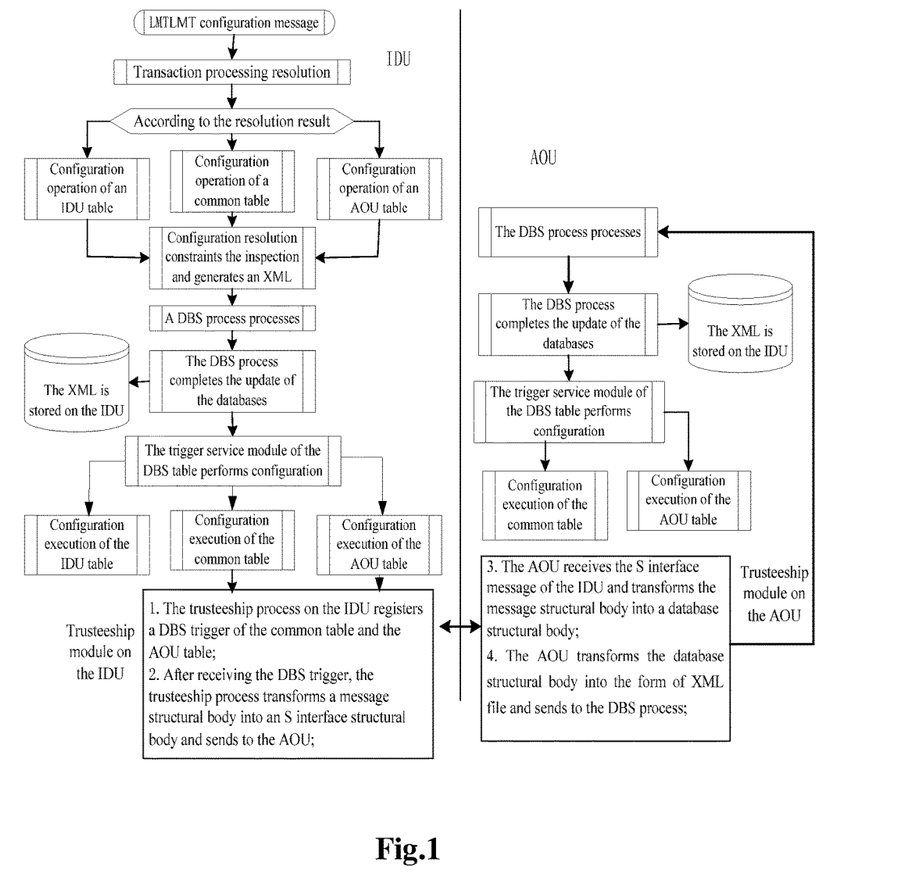
FIG. 1 is a flow for receiving, resolving and distributing data of indoor units trusted on all-outdoor units in a microwave device of ZTE Corporation.

FIG. 1 is a flow for receiving, resolving and distributing data of indoor units (or IP devices) trusted on all-outdoor units in a microwave device of ZTE Corporation.

Figure 2:
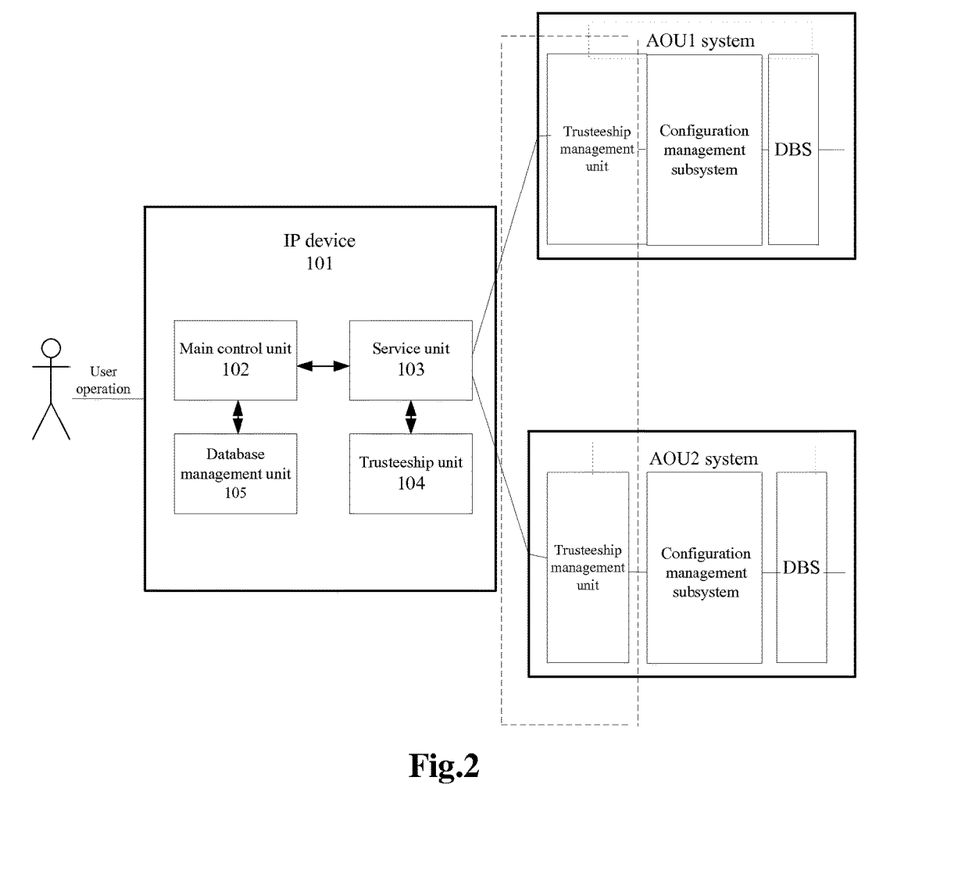
FIG. 2 is a schematic diagram of indoor units trusted on all-outdoor units in a microwave device of ZTE Corporation.

FIG. 2 shows a structure in which the present invention uses an IP device and an AOU to implement trusteeship, wherein: the IP device 101 includes: a main control unit 102; a service unit 103; a database management unit 105; and a trusteeship unit 104.

The main control unit 102 is the centre for storing data, which stores relevant data of the IP device 101 and the AOU; the service unit 103 is set to connect to an all-outdoor device to transmit service data and management data; the database management unit 105 is used to manage user data of the IP device 101 and the AOU; the trusteeship unit 104 is set to cooperate with devices; in addition, the IP device may also be set with a message transformation interface module used to transform message IDs and structural bodies of the devices.

The all-outdoor unit (AOU) is a trusted microwave device which may work in an independent mode and a trusteeship mode; if it works in an independent mode, a user may directly access the AOU for management, and at this moment, the AOU is not qualified for trusteeship; and if it works in a trusteeship mode, the user manages the AOU via the IP device 101.

Figure 3:
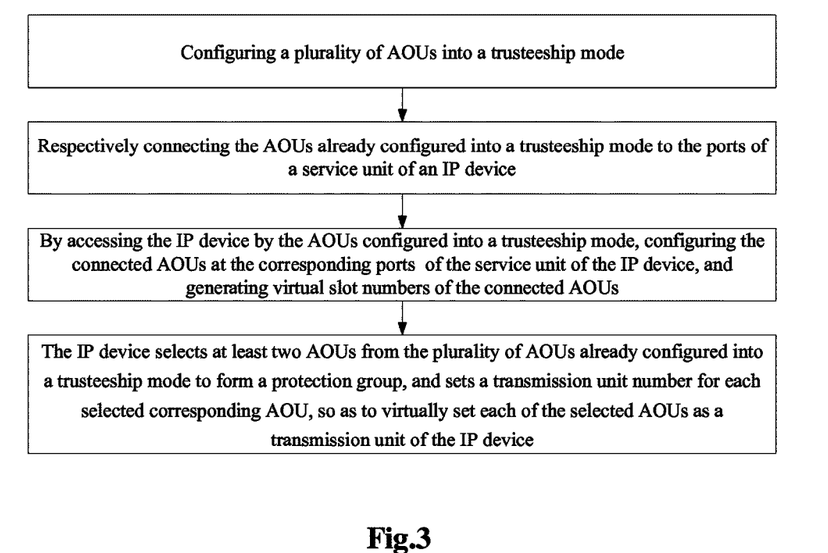
FIG. 3 is a schematic diagram of a method for implementing microwave transmission device trusteeship of the embodiments of the present invention.

FIG. 3 shows a method for implementing a microwave transmission device trusteeship of the present invention. As shown in FIG. 3, the method includes the steps of:

configuring a plurality of all-outdoor units (AOUs) into a trusteeship mode;

respectively connecting a plurality of AOUs already configured into a trusteeship mode to the ports of a service unit of an IP device;

by accessing the IP device by the AOUs configured into a trusteeship mode, configuring the connected AOUs at the corresponding ports of the service unit 102 of the IP device 101, and generating virtual slot numbers of the connected AOUs; and the IP device 101 selects at least two AOUs from the plurality of AOUs already configured into a trusteeship mode to form a protection group, and sets a transmission unit number for each selected corresponding AOU, so as to virtually set each of the selected AOUs as a transmission unit of the IP device.

In the present invention, the transmission unit number set for the selected corresponding AOU is a virtual slot number of the AOU.

The method for implementing microwave transmission device trusteeship of the present invention further includes: the IP device 101 receives and stores user configuration data about configuration of the protection group, which is issued by a user, and after resolving and converting the user configuration data into a data structure required by the AOU according to a data model, distributes same to all the AOUs of the protection group.

The method for implementing microwave transmission device trusteeship of the present invention further includes: after the IP device distributes the user configuration data to all the AOUs of the protection group, an AOU determines a working mode thereof by detecting a connection state with the IP device.

The operation of an AOU determining a working mode thereof by detecting a connection state with the IP device of the present invention includes: when the AOU detects that it has already been connected to the IP device, if the AOU is working in a trusteeship mode, it continuing to maintain a trusteeship mode thereof; otherwise, it modifying the mode into a trusteeship mode.

In addition, the IP device 101 uses the main control unit 102 thereof to store the data of all the trusted AOUs, so as to manage an AOU system as a controlled system of the IP device. The IP device 101 uses a trusteeship module 104 thereof to cooperate with the trusted AOUs, so as to maintain a trusteeship service. The IP device 101 uses a service module 103 of each trusted AOU connected thereto to transmit service data and management data.

In the method for implementing microwave transmission device trusteeship of the present invention, the protection group includes one of the following:

a 1+1HSB protection pair configured by two AOUs;

an XPIC transmission unit configured by two AOUs;

an XPIC transmission unit with PLA configuration configured by two AOUs; and two protection pairs configured by four AOUs.

Figure 4:
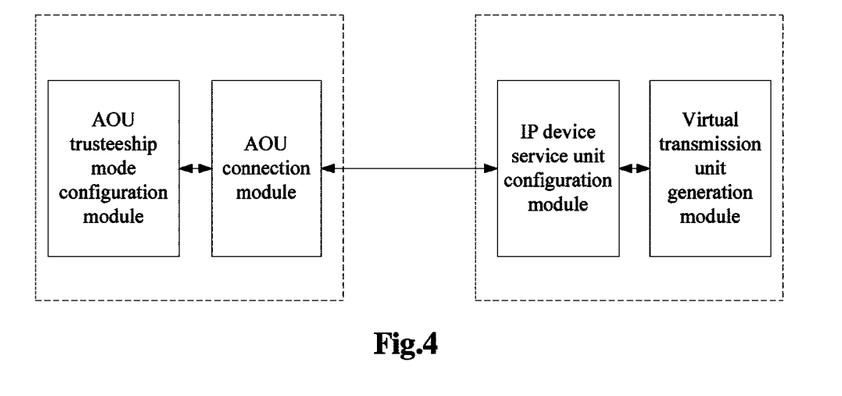
FIG. 4 is a schematic diagram of a device for implementing microwave transmission device trusteeship of the embodiments of the present invention.

FIG. 4 shows a device for implementing microwave transmission device trusteeship of the present invention, includes:

an AOU trusteeship mode configuration module set to configure all-outdoor units (AOUs) into a trusteeship mode;

an AOU connection module set to respectively connect the AOUs already configured into a trusteeship mode to the ports of a service unit of an IP device;

an IP device service unit configuration module set to configure the connected AOUs at the ports corresponding to the service unit of the IP device and generate virtual slot numbers of the connected AOUs when the AOUs configured into a trusteeship mode access the IP device; and a virtual transmission unit generation module set to let the IP device select at least two AOUs from the plurality of AOUs already configured into a trusteeship mode to form a protection group, and set a transmission unit number for each selected corresponding AOU, so as to virtually set each of the selected AOUs as a transmission unit of the IP device.

The application of air interface configuration of the microwave device includes: 1+0, 1+1HSB, 1+1HSB+SD, 1+1HSB+FD, 2+0XPIC, 2+0XPIC(PLA), 2+2XPIC+HSB, 2+2XPIC+HSB+SD. Elaboration is made against 1+1HSB, 2+0XPIC (PLA), and 2+2XPIC+HSB.

Figure 5:
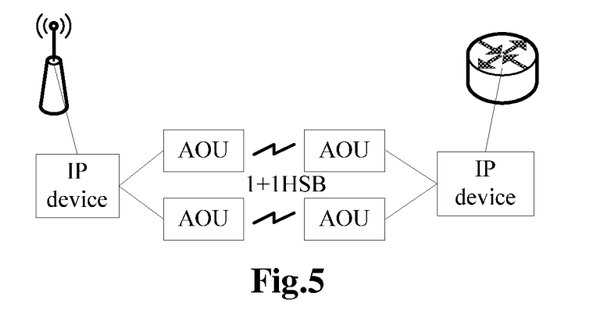
FIG. 5 is an application schematic diagram of 1+1HSB in a method for microwave device trusteeship of the embodiments of the present invention.

1. Implementation steps of the present invention in 1+1HSB configuration, as shown in FIG. 5:

A. configuring AOUs that are used into a trusteeship mode, and connecting same to the ports of a service unit of an IP device;

B. accessing the IP device, configuring the service unit via the IP device, and configuring the connected AOUs at the corresponding ports of the service unit, and generating corresponding virtual slot numbers;

C. selecting two AOUs from the AOUs that are already configured to form a 1+1HSB protection pair, and setting a corresponding transmission unit number;

D. configuring the user data at a corresponding transmission unit and storing the data into the IP device.

E. the IP device resolves the configuration data according to a data model and converts the data into a data structure required by the AOUs and distributes same to groups of AOUs that form protection pairs; and F. an opposite end performs the same configuration or performs the configuration of a corresponding relationship to complete the docking between devices so as to perform normal service transmission.

Figure 6:
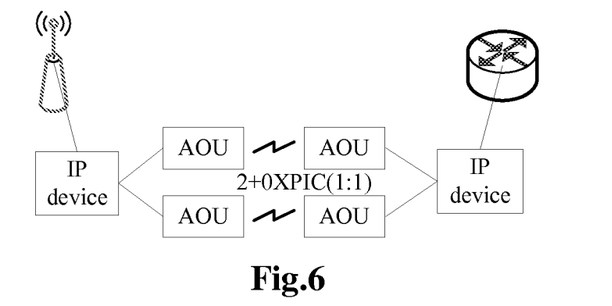
FIG. 6 is an application schematic diagram of 2+0XPIC (1:1) in the method for microwave device trusteeship of the embodiments of the present invention.

2. Implementation steps of the present invention in 2+0XPIC configuration, as shown in FIG. 6:

A. configuring AOUs that are used into a trusteeship mode, and connecting same to the ports of the service unit of an IP device;

B. accessing the IP device, configuring the service unit via the IP device, and configuring the connected AOUs at the corresponding ports of the service unit, and generating corresponding virtual slot numbers;

C. selecting two AOUs from the resource of AOUs that are already configured to form a 2+0XPIC protection pair, i.e. 2 AOUs forming 1 XPIC transmission unit;

D. selecting the direction of the XPIC of the AOUs (wherein one is in the H direction, and the other is in the V direction) and the mode thereof, and issuing and storing the configuration data in the IP device;

E. the IP device resolves the configuration data according to a data model, and converts the data into a data structure required by the AOUs and distributes same to the AOUs that form the XPIC group; and F. connecting the devices according to the configuration, and completing the XPIC function of the AOU devices.

Figure 7:
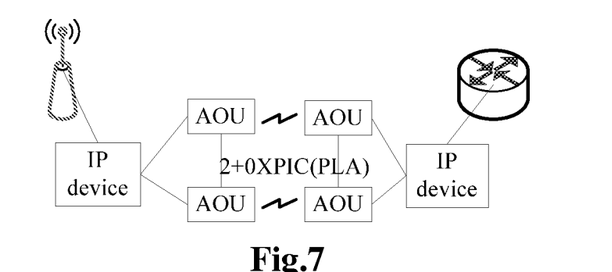
FIG. 7 is an application schematic diagram of 2+0XPIC (PLA) in the method for microwave device trusteeship of the embodiments of the present invention.
Figure 8:
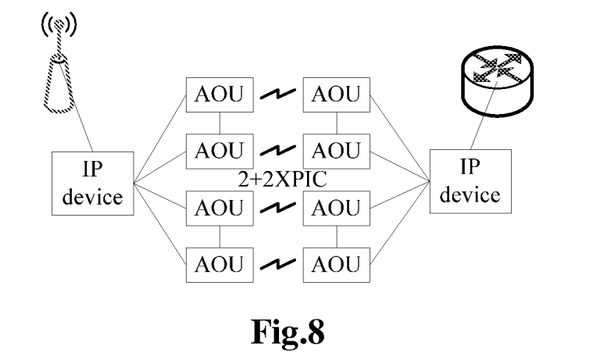
FIG. 8 is an application schematic diagram of 2+2XPIC in the method for microwave device trusteeship of the embodiments of the present invention.

3. Implementation steps of the present invention in 2+0XPIC(PLA) configuration, as shown in FIG. 7:

A. configuring AOUs that are used into a trusteeship mode, and connecting same to the ports of a service unit of an IP device;

B. accessing the IP device, configuring the service unit via the IP device, and configuring the connected AOUs at the corresponding ports of the service unit, and generating corresponding virtual slot numbers;

C. configuring two of the AOUs into an XPIC according to the steps in 2;

D. then selecting the AOUs that are configured into the XPIC, adding the configuration of a PLA, and configuring one of them as the primary PLA and the other one as the standby PLA, and storing the configuration data in the IP device;

E. the IP device resolves the configuration data according to a data model, and converts the data into a data structure required by the AOUs and distributes same to the AOUs that form the XPIC group; and F. after the configuration completes, connecting the devices and completing the 2+0XPIC(PLA) function of the AOU devices;

Implementation steps of the present invention in 2+2XPIC+HSB configuration, as shown in FIG. 8:

A. configuring AOUs that are used into a trusteeship mode, and connecting same to the ports of a service unit of an IP device;

B. accessing the IP device, configuring the service unit via the IP device, and configuring the connected AOUs at the corresponding ports of the service unit, and generating corresponding virtual slot numbers;

C. according to the steps in 1, selecting four AOUs and configuring same into two protection groups: protection group 1 and protection group 2;

D. then setting PROTECT1 in the H direction (or V direction) of the XPIC, and setting PROTECT2 in the V direction (or H direction) of the XPIC, wherein H direction and V direction form an XPIC group, and storing the configured data into the IP device;

E. the IP device resolves the configuration data according to a data model, and converts the data into a data structure required by the AOUs and distributes same to the AOUs that form the XPIC group; and F. connecting the devices according to the configuration, and completing the 2+2XPIC+HSB function between the AOUs.

The present invention virtualizes an all-outdoor unit into a slot or a transmission unit of an IP device, wherein the IP device is the data storage centre of all the trusted all-outdoor devices, and the trusted devices store data related to themselves only; by means of the method, a user can achieve the management of protection configuration, XPIC configuration, PLA configuration and other configurations, thereby achieving the unified management and quick configuration of all-outdoor devices, and facilitating the cooperative usage of the devices.

In addition, the IP device and the all-outdoor device transform message IDs and resources via an S interface, causing the coupling of resource definition between two different devices to reduce, and facilitating the independent development of different devices; as regards the management of a working mode of the devices, a trusteeship module provides two ways for setting a working mode: manual setting and automatic setting, which facilitates the usage of the devices by users.

In addition, trusting the all-outdoor device on the IP device may expand the transmission direction of the IP device. The calculation formula of the expansion capacity C between the number of service units supported by the IP device M (M≥0), the number of service ports of each service unit N (N≥0), and the number of directions supported by the IP device, for example, in the case of no trusteeship K (K≤M) is C=M*N−K. For the microwave transmission device developed by ZTE Corporation, M is 6, N is 2, and K is 6; therefore, in the case of no trusteeship, the number of supported transmission directions is 6, while when in trusteeship, it changes into 12.

Although detailed description of the present invention is made above, the present invention is not limited thereto, and a person skilled in the art may perform various modifications according to the principle of the present invention. Therefore, any modification made according to the principle of the present invention should be understood as falling into the scope of protection of the present invention.

INDUSTRIAL APPLICABILITY

The technical solution provided by the embodiments of the present invention can be applied to microwave communication, and specifically, to the management of protection configuration, XPIC configuration, PLA configuration and other configurations, so as to achieve the unified management and quick configuration of all-outdoor devices, and facilitate the cooperative usage of the microwave devices.

What is claimed is:

1. A method for implementing microwave transmission device trusteeship, comprising:
   configuring a plurality of all-outdoor units (AOUs) into a trusteeship mode;
   respectively connecting the AOUs configured into the trusteeship mode to a plurality of ports of a service unit of an IP device;
   the AOUs configured into the trusteeship mode accessing the IP device, and configuring the connected AOUs at the corresponding ports of the service unit of the IP device, and generating virtual slot numbers of the connected AOUs; and
   the IP device selecting at least two AOUs from the plurality of AOUs configured into the trusteeship mode to form a protection group, and setting a transmission unit number for each selected AOU, so as to virtually set each of the selected AOUs as a transmission unit of the IP device.

2. The method according to claim 1, wherein the transmission unit number set for the selected AOU is a virtual slot number of the AOU.

3. The method according to claim 2, wherein the method further comprises:
   the IP device receiving and storing user configuration data about configuration of the protection group, which is issued by a user, and after converting the user configuration data into a data structure required by the AOU, distributing same to all the AOUs of the protection group.

4. The method according to claim 2, wherein the IP device uses a main control unit thereof to store data of all the trusted AOUs, so as to manage an AOU system as a controlled system of the IP device.

5. The method according to claim 4, wherein the method further comprises:
   after the IP device distributes the user configuration data to all the AOUs of the protection group, an AOU determining a working mode thereof by detecting a connection state with the IP device.

6. The method according to claim 5, wherein the operation of an AOU determining a working mode thereof by detecting a connection state with the IP device comprises:
   when the AOU detects that it has already been connected to the IP device, if the AOU is working in a trusteeship mode, it continuing to maintain a trusteeship mode thereof; otherwise, it modifying the mode into a trusteeship mode.

7. The method according to claim 2, wherein the IP device uses a trusteeship unit thereof to cooperate with the trusted AOUs, so as to maintain a trusteeship service.

8. The method according to claim 7, wherein the IP device uses a service unit connected to each trusted AOU to transmit service data and management data.

9. The method according to claim 8, wherein the protection group comprises one of the following:
   a 1+1HSB protection pair configured by two AOUs;
   an XPIC transmission unit configured by two AOUs;
   an XPIC transmission unit with PLA configuration configured by two AOUs; and
   two protection pairs configured by four AOUs.

10. A device for implementing microwave transmission device trusteeship, which comprises a hardware processor, and the hardware processor is configured to perform programming modules stored in a memory, wherein the programming modules comprise:
    an AOU trusteeship mode configuration module, configured to configure all-outdoor units (AOUs) into a trusteeship mode;
    an AOU connection module, configured to respectively connect the AOUs already configured into the trusteeship mode to a plurality of ports of a service unit of an IP device;
    an IP device service unit configuration module, configured to configure the connected AOUs at the corresponding ports of the service unit of the IP device and generate virtual slot numbers of the connected AOUs when the AOUs configured into a trusteeship mode access the IP device; and
    a virtual transmission unit generation module, configured to let the IP device select at least two AOUs from the plurality of AOUs already configured into a trusteeship mode to form a protection group, and set a transmission unit number for each selected corresponding AOU, so as to virtually set each of the selected AOUs as a transmission unit of the IP device.

11. The method according to claim 3, wherein the IP device uses a main control unit thereof to store data of all the trusted AOUs, so as to manage an AOU system as a controlled system of the IP device.

12. The method according to claim 3, wherein the IP device uses a trusteeship unit thereof to cooperate with the trusted AOUs, so as to maintain a trusteeship service.

13. The device according to claim 10, wherein the transmission unit number set for the selected AOU is a virtual slot number of the AOU.

14. The device according to claim 13, wherein the IP device is further configured to receive and store user configuration data about configuration of the protection group, which is issued by a user, and after converting the user configuration data into a data structure required by the AOU, distribute same to all the AOUs of the protection group.

15. The device according to claim 14, wherein the IP device uses a main control unit thereof to store data of all the trusted AOUs, so as to manage an AOU system as a controlled system of the IP device.

16. The device according to claim 15, wherein after the IP device distributes the user configuration data to all the AOUs of the protection group, the AOU determines a working mode thereof by detecting a connection state with the IP device.

17. The device according to claim 16, wherein when the AOU detect that it has already been connected to the IP device, if the AOU is working in a trusteeship mode, it continuing to maintain a trusteeship mode thereof; otherwise, it modifying the mode into a trusteeship mode.

18. The device according to claim 13, wherein the IP device uses a trusteeship unit thereof to cooperate with the trusted AOUs, so as to maintain a trusteeship service.

19. The device according to claim 18, wherein the IP device uses a service unit connected to each trusted AOU to transmit service data and management data.

20. The device according to claim 19, wherein the protection group comprises one of the following:
- a 1+1HSB protection pair configured by two AOUs;
- an XPIC transmission unit configured by two AOUs;
- an XPIC transmission unit with PLA configuration configured by two AOUs; and
- two protection pairs configured by four AOUs.

* * * * *